(12) United States Patent
Bartonek (10) Patent No.: US 9,090,271 B2
(45) Date of Patent: Jul. 28, 2015

(54) SYSTEM AND METHOD FOR CHARACTERIZING DRAGGING EQUIPMENT

(71) Applicant: Progress Rail Services Corporation, Albertville, AL (US)

(72) Inventor: Mark Joseph Bartonek, Blue Springs, MO (US)

(73) Assignee: Progress Rail Services Corporation, Albertville, AL (US)

( * ) Notice: Subject to any disclaimer, the term of this patent is extended or adjusted under 35 U.S.C. 154(b) by 87 days.

(21) Appl. No.: 13/659,199

(22) Filed: Oct. 24, 2012

(65) Prior Publication Data

US 2014/0110536 A1 Apr. 24, 2014

(51) Int. Cl.
G01M 7/00 (2006.01)
B61L 27/00 (2006.01)

(52) U.S. Cl.
CPC .............. B61L 27/0094 (2013.01); G01M 7/00 (2013.01)

(58) Field of Classification Search
CPC .............................. G01M 7/00; B61L 27/0094
See application file for complete search history.

(56) References Cited

U.S. PATENT DOCUMENTS

| | | | |
|---|---|---|---|
| 2,662,973 A | 12/1953 | McGowan et al. |
| 2,691,722 A | 10/1954 | Lewis |
| 2,963,575 A | 12/1960 | Pelino et al. |
| 2,993,988 A | 7/1961 | Post et al. |
| 3,546,448 A | 12/1970 | Pelino |
| 3,558,875 A | 1/1971 | Gieskieng |
| 3,558,876 A | 1/1971 | Tillman et al. |
| 4,129,276 A | 12/1978 | Svet |
| 4,379,330 A * | 4/1983 | Sanville ................... 246/249 |
| 4,696,446 A | 9/1987 | Mochizuki et al. |
| 4,702,104 A | 10/1987 | Hallberg |
| 4,895,324 A | 1/1990 | Buckles |
| 5,150,618 A | 9/1992 | Bambara |
| 5,433,111 A | 7/1995 | Hershey et al. |
| 5,462,244 A | 10/1995 | Van Der Hoek et al. |
| 5,699,986 A | 12/1997 | Welk |
| 5,743,495 A | 4/1998 | Welles, II et al. |
| 5,793,492 A | 8/1998 | Vanaki |

(Continued)

FOREIGN PATENT DOCUMENTS

| | | |
|---|---|---|
| CN | 201296264 | 8/2009 |
| DE | 4325018 | 3/1994 |

(Continued)

OTHER PUBLICATIONS

U.S. Appl. No. 13/658,998 of Mark Joseph Bartonek et al., entitled "Flat Wheel Detector With Multiple Sensors" filed Oct. 24, 2012.

(Continued)

*Primary Examiner* — John Q Nguyen
*Assistant Examiner* — Michael Kerrigan
(74) *Attorney, Agent, or Firm* — Finnegan, Henderson, Farawbow, Garrett & Dunner, LLP (57) ABSTRACT

The disclosure is directed to a method and apparatus for characterizing an object protruding beneath a train traveling along a rail. The method may include receiving one or more signals indicative of a detected horizontal force component and a detected vertical force component generated by impact of the object with a stationary impact element. The method may also characterize the object based on the detected horizontal and vertical force components.

26 Claims, 5 Drawing Sheets

(56) References Cited

U.S. PATENT DOCUMENTS

| | | |
|---|---|---|
| 6,412,332 B1 * | 7/2002 | Bartonek ............. 73/12.01 |
| 6,768,551 B2 | 7/2004 | Mian et al. |
| 6,909,514 B2 | 6/2005 | Nayebi |
| 6,951,132 B2 | 10/2005 | Davenport et al. |
| 7,292,144 B2 | 11/2007 | Ballinger |
| 7,861,979 B2 | 1/2011 | Beaman |
| 7,937,192 B2 | 5/2011 | Lueger et al. |
| 8,006,559 B2 | 8/2011 | Mian et al. |
| 8,430,363 B2 | 4/2013 | Hesser et al. |
| 2003/0072001 A1 | 4/2003 | Mian et al. |
| 2006/0076461 A1 | 4/2006 | DeRose et al. |
| 2011/0118899 A1 | 5/2011 | Brooks et al. |
| 2011/0118914 A1 | 5/2011 | Brooks et al. |

FOREIGN PATENT DOCUMENTS

| | | |
|---|---|---|
| JP | 2008-58256 | 3/2008 |
| JP | 2008-240473 | 10/2008 |
| WO | WO 2007/009132 | 1/2007 |
| WO | WO 2010/000850 | 1/2010 |

OTHER PUBLICATIONS

U.S. Appl. No. 13/659,169 of Mark Joseph Bartonek, entitled "Speed Sensitive Dragging Equipment Detector" filed Oct. 24, 2012.

U.S. Appl. No. 13/659,262 of Mark Joseph Bartonek, entitled "Multi-Function Dragger" filed Oct. 24, 2012.

* cited by examiner

FIG. 5 ns of dragging equipment or objects that p

SYSTEM AND METHOD FOR CHARACTERIZING DRAGGING EQUIPMENT

TECHNICAL FIELD

The present disclosure is directed to dragging equipment and, more particularly, to a system and method for characterizing dragging equipment.

BACKGROUND

Detection systems for the railroad industry provide methods and apparatus for detecting dragging, or otherwise improperly hanging or protruding vehicle equipment when a train passes by a railside monitoring station. Systems or apparatus for detecting the presence of objects dragging beneath a train are sometimes referred to as "draggers". In various implementations, draggers may be placed at twenty mile intervals, ten mile intervals, or other spaced intervals along stretches of railroad track, in addition to being placed at railroad crossings and in railroad switching yards. If a dragging object, or otherwise improperly protruding equipment is detected by a dragger, the train may be stopped so that the object can be secured, or removed to reduce the potential for derailment or other problems. Existing systems for detecting dragging equipment underneath trains include sensors mounted on stationary strike plates or impact elements positioned in the path of the protruding equipment. Impacts of protruding equipment against the stationary impact elements cause vibrations or accelerations in the impact elements, and in the sensors mounted thereon.

One problem associated with these types of impact detection systems involves the triggering of false alarms, in particular, false alarms can be triggered by vibrations from flat wheels. A flat wheel, or a wheel with worn tread can cause a vertical impact on existing impact sensors that the existing impact detection systems are not capable of distinguishing from actual dragging equipment.

One attempt to avoid the problem of triggering false alarms is disclosed in U.S. Pat. No. 6,412,332 to M. Bartonek that issued on Jul. 2, 2002 (the '332 patent). The '332 patent discloses an apparatus for detecting objects dragging beneath a train as the train travels along a rail. The apparatus includes a stationary impact element rigidly supported along the rail, with a single axis sensor disposed in a horizontal orientation relative to the impact element to detect only horizontal components of any impact forces.

Although the impact detection system of the '332 patent eliminates detection of vertical forces, and therefore reduces the detection of vibrations from flat wheels, this solution for selective detection of only impacts that create horizontal forces, may provide a less than optimal impact detection system. In particular, the impact detection system of the '332 patent has no way to detect impacts of dragging equipment that create only vertical forces.

The disclosed dragging equipment detector is directed to overcoming one or more of the problems set forth above and/or other problems in the art.

SUMMARY

In one aspect, the present disclosure is directed to a method of characterizing an object protruding beneath a train traveling along rails. The method may include receiving one or more signals indicative of a detected horizontal force component and a detected vertical force component generated by impact of the object with a stationary impact element. The method may also include characterizing the object based on the horizontal and vertical force components.

In another aspect of the disclosure, an apparatus is provided for characterizing an object protruding beneath a train moving along rails. The apparatus may include a stationary impact element positioned to extend in a direction approximately orthogonal to a travel direction of the train and extending across the rails, with an impact surface of the stationary impact dement oriented at an angle inclined to the travel direction. One or more sensors may be mounted on the stationary impact element in one or more directions that allow each of the one or more sensors to detect horizontal and vertical force components on the stationary impact element when the object impacts the stationary impact element. The apparatus may also include a processor configured to characterize the object based on the horizontal and vertical force components.

DETAILED DESCRIPTION

Figure 1:
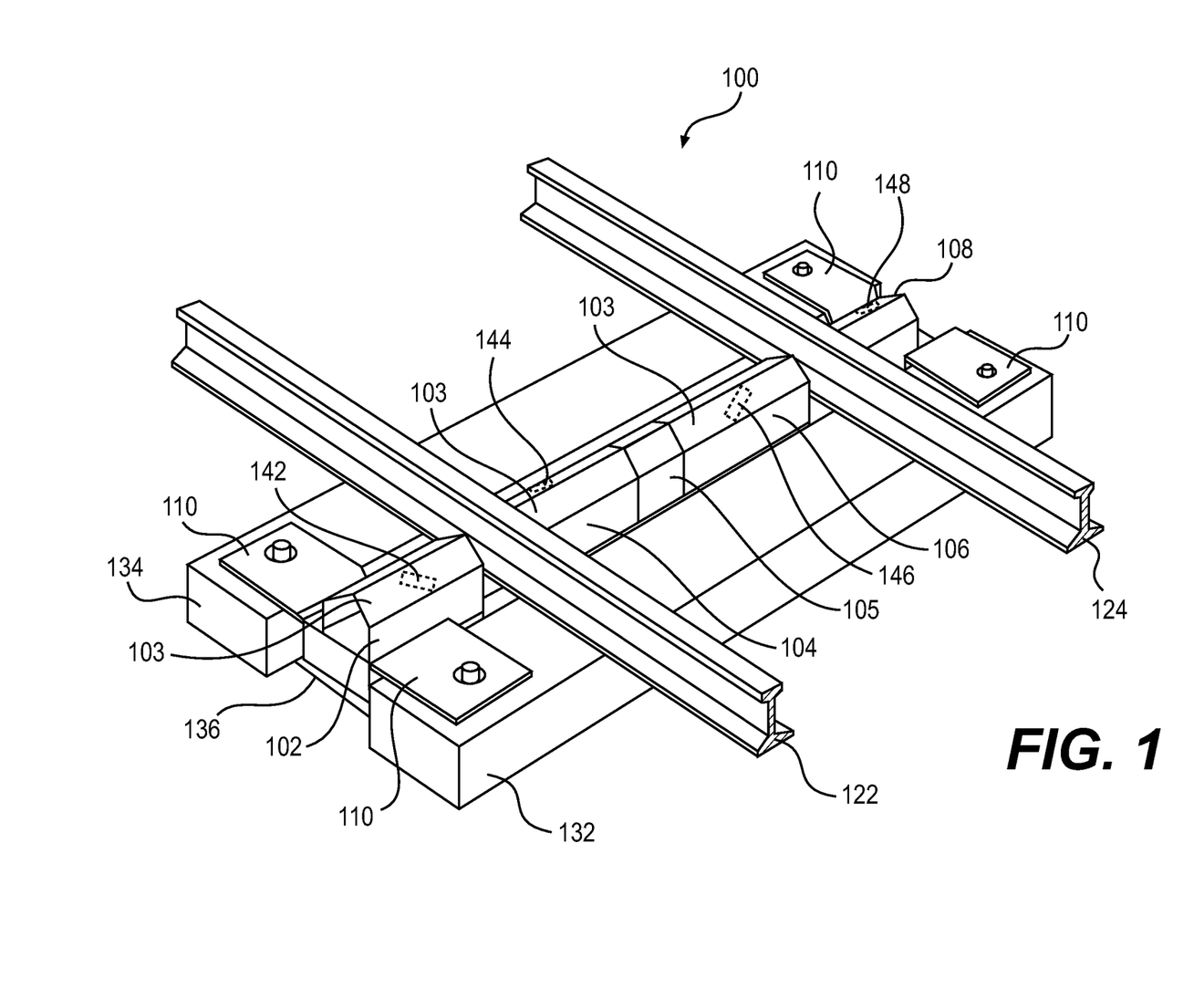
FIG. 1 is a perspective view of an exemplary system for characterizing dragging equipment.
Figure 2:
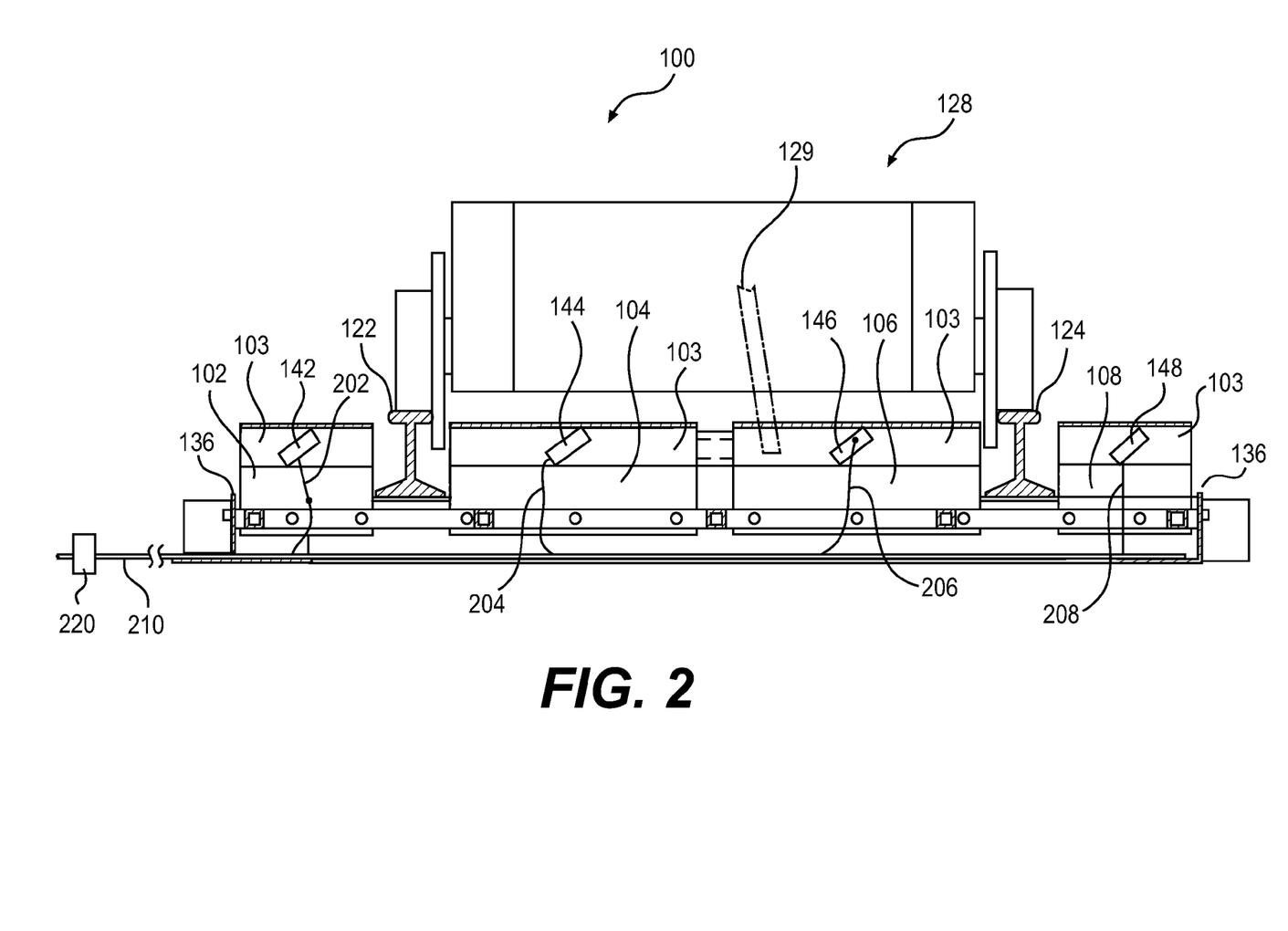
FIG. 2 is an elevation view of the exemplary system shown in FIG. 1.

FIGS. 1 and 2 illustrate an apparatus 100 for characterizing dragging equipment or objects 129 protruding beneath, hanging below, dragging beneath, or otherwise improperly extending from train 128 in the direction of train rails 122, 124. Dragging equipment or objects protruding beneath the train may bear the risk of damaging the train or the rails, breaking off and posing a risk to people or objects near the rails, or even causing derailment of the train. Because of the expense and inconvenience of stopping a train frequently to secure low-risk objects, however, a system and method is needed for detecting dragging objects and characterizing any detected objects so as to distinguish between various types of objects that may be dragged by a train.

Figure 3:
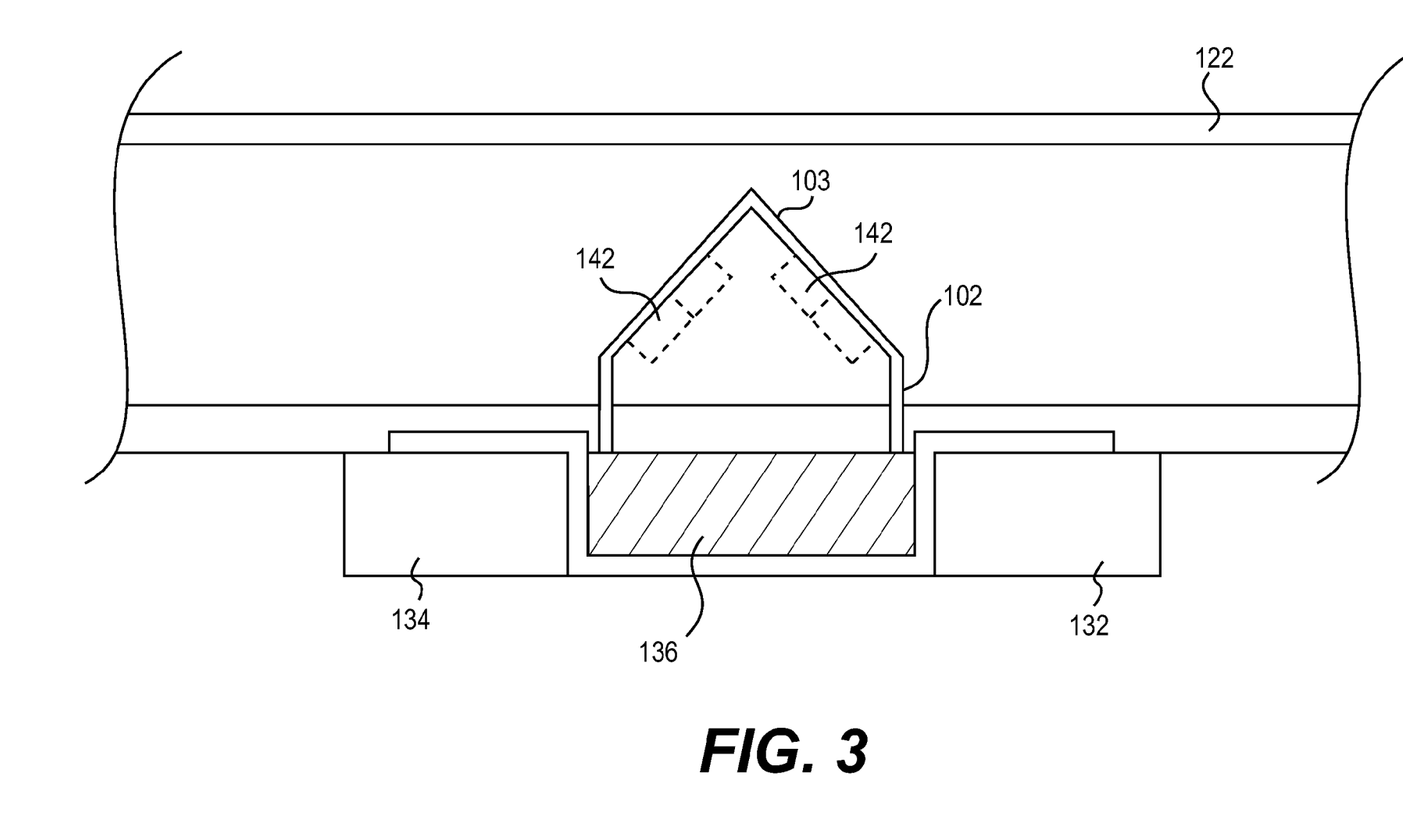
FIG. 3 is a side sectional view of the exemplary system shown in FIGS. 1 and 2.

Apparatus 100, shown in FIGS. 1 and 2, and partially in cross-section in FIG. 3, comprises one or more stationary impact elements 102, 104, 106, 108. One disclosed implementation may include two stationary impact elements 104, 106 located in between train rails 122, 124, and two stationary impact elements 102, 108 located outside of train rail 122 and train rail 124, respectively. The two stationary impact elements 104, 106 located in between train rails 122, 124 may be rigidly coupled together with a connector plate 105, or they may each be kept separated from each other for applications where impacts close to one rail are to be distinguished from impacts close to the other rail. Other possible arrangements of stationary impact elements 102, 104, 106, 108 are contemplated, including one or more stationary impact elements positioned between the train rails, and/or positioned outside of the rails.

Stationary impact elements 102, 104, 106, 108 may be supported in various ways, including mounted in a frame 136, shown in FIGS. 1, 2, and 3. Frame 136 may be disposed below rails 122, 124, and between a pair of ties 132, 134. Ties 132, 134 support rails 122, 124 and extend underneath and generally orthogonal to rails 122, 124. Ties 132, 134 may be made of different materials, including wood, cement, or other composite materials. In alternative implementations, stationary impact elements 102, 104, 106, 108 may be attached directly to wood ties 132, 134. Impact elements 102, 104, 106, 108 may be fastened to frame 136 with flange bolts and/or studs and nuts, or otherwise joined to frame 136. Frame 136 may be fastened to wood ties 132, 134 with a pair of U-tie brackets 110, or other shaped brackets or structures.

As shown in FIGS. 1, 2, and 3, each impact element 102, 104, 106, 108 may be formed from a single piece of rigid material, such as steel plate, aluminum, or composite materials, or from multiple pieces of rigid material that are joined together. Each impact element 102, 104, 106, 108 may include generally vertical surfaces extending upwards from frame 136 and contiguous with one or more inclined angle impact surfaces 103 positioned generally in an area of potential impact with dragging equipment 129 or objects extending below train 128. Impact elements 102, 104, 106, 108 may extend in a direction approximately orthogonal to a travel direction of train 128 and extending across rails 122, 124.

The inclined angle impact surfaces 103 of each impact element 102, 104, 106, 108 may be oriented at an angle inclined to the travel direction of train 128, as best seen in the perspective view of FIG. 1, or the sectional view of FIG. 3. The inclined angle of impact surface 103 may allow dragging equipment 129 to impact inclined angle impact surface 103 of each impact element 102, 104, 106, 108 and slide over the top of each impact element. The inclined angle configuration reduces the magnitude of normal components of the impact forces on each impact element 102, 104, 106, 108, thereby reducing the potential for the impact forces to destroy or seriously damage impact elements 102, 104, 106, 108. One of ordinary skill in the art will recognize that inclined angle impact surfaces 103 of impact elements 102, 104, 106, 108, may be configured to slope at various angles to horizontal and vertical, with various implementations having inclined angle impact surfaces 103 oriented at approximately 45 degrees to the travel direction of train 128. Other implementations may have an inclined angle impact surface of an impact element that is within the range of approximately 30 degrees to approximately 60 degrees inclined to the direction of travel of train 128.

As shown in FIGS. 1 and 2, each impact element 102, 104, 106, and 108 may house or support at least one sensor 142, 144, 146, and 148, respectively. Sensors 142, 144, 146, 148, illustrated in FIGS. 1, 2, and 3, may be oriented on respective impact elements 102, 104, 106, 108 in directions that allow each sensor to detect both horizontal and vertical force components generated on each impact element when an object impacts the impact element. In various implementations sensors 142, 144, 146, 148 may be mounted on inclined angle impact surfaces 103 of each impact element 102, 104, 106, 108, and oriented at approximately a 45 degree angle to horizontal. Alternative implementations may also include providing multiple, single-axis sensors on each of the impact elements, with each of the single-axis sensors oriented to detect a single directional component of an impact force. The signals from multiple, single-axis sensors may then be combined to provide a complete characterization of the impact force. Sensors 142, 144, 146, 148 may be piezoelectric accelerometers that are capable of detecting acceleration in two or more different orthogonal directions. The accelerations are transmitted to sensors 142, 144, 146, 148 through impact elements 102, 104, 106, 108. Piezoelectric accelerometers mounted on each impact element may be transducers that generate an electrical charge proportional to acceleration of the sensors resulting from an impact on the impact element.

FIG. 3 illustrates one possible implementation wherein sensor 142 is shown mounted on one or both inside, inclined angle impact surfaces 103 of impact element 102. The dashed outline of sensor 142 is shown in two alternative locations contacting either of the inside surfaces of oppositely facing inclined angle impact surfaces 103 of impact element 102. In various implementations, one or more of sensors 142, 144, 146, 148 may be mounted on one or more of inclined angle impact surfaces 103 on either side of impact elements 102, 104, 106, 108 in order to be in position for detecting potential impacts when train 128 is traveling in either direction along rails 122, 124. Placement of sensors 142, 144, 146, 148 on the inside of inclined angle impact surfaces 103 of impact elements 102, 104, 106, 108 may protect the sensors from direct impact by an object 129 improperly protruding from train 128. One of ordinary skill in the art will recognize that there are various ways in which sensors 142, 144, 146, 148 may be mounted on impact elements 102, 104, 106, 108 to detect accelerations in the impact elements, including being imbedded in the impact element, contained within recesses in the impact elements, bonded to the impact elements with an epoxy, soldered or brazed to the impact elements, or contained within housings that are bolted or otherwise joined to the impact elements.

Figure 4:
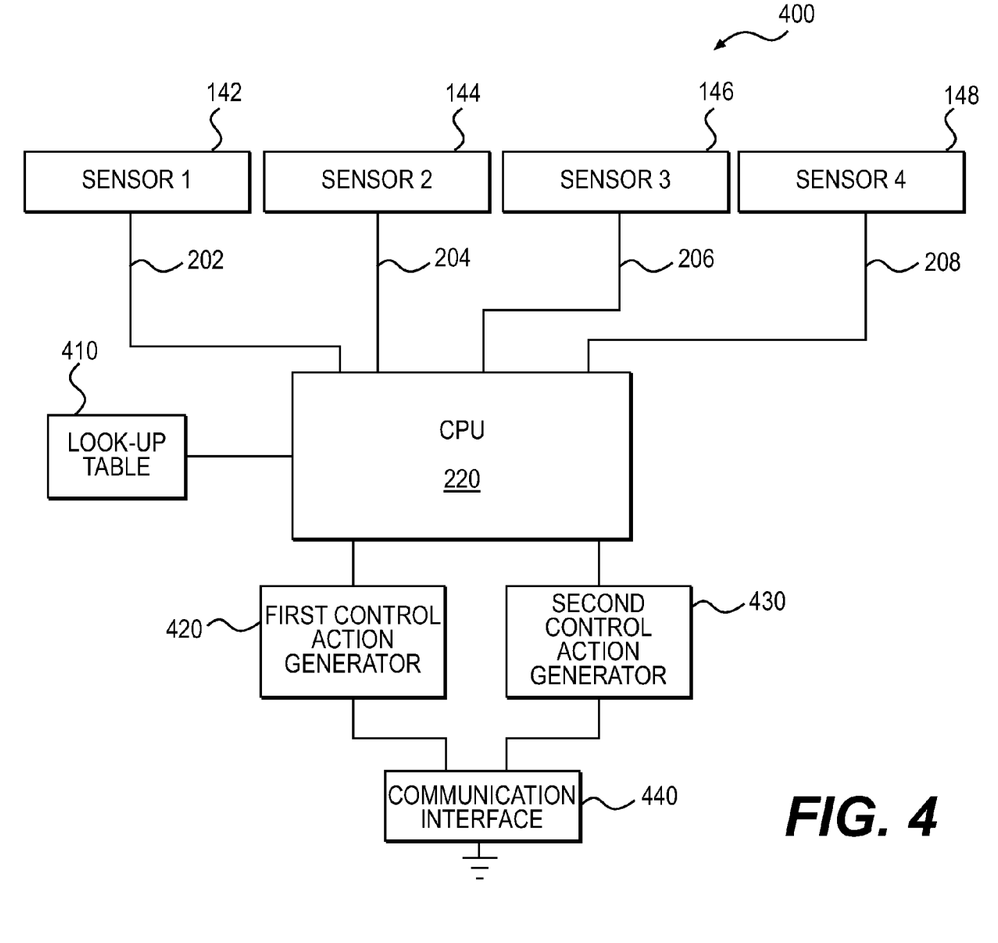
FIG. 4 is a block diagram of a detection circuit that may be used with the exemplary system shown in FIGS. 1, 2, and 3.

FIG. 4 is a block diagram illustrating an arrangement for an exemplary detection circuit 400 that may be used with various implementations of the disclosure. Sensors 142, 144, 146, 148 may be connected by cables 202, 204, 206, 208, respectively (also shown in FIG. 2), through a conduit 210 to a CPU (central processing unit) 220. Alternatively, the sensors could be communicatively coupled to CPU 220 through various junction boxes, serial or parallel buses, wirelessly, or through an Ethernet connection. CPU 220 may be communicatively coupled to a look-up table 410, or other source of data identifying characteristic force components or other parameters associated with known or expected types of impacts on impact elements 102, 104, 106, 108.

Expected types of impacts may be impacts that are commonly or frequently experienced or that may be considered likely to happen based on past experiences, mechanical structure or location of the equipment on the train, or susceptibility to wear and tear from repeated use. In various implementations, impacts may be expected from equipment such as air hoses and brake lines since these types of equipment are frequently connected and disconnected during coupling and decoupling of train cars, and may come disconnected as a result of not having been connected properly, or as a result of wear and tear on the coupling mechanisms. Additionally, equipment such as the unloading doors on hopper cars may not be latched properly after unloading at a terminal, and may therefore come unconnected during motion of the train and hang down below the train. The types of impacts caused by flat wheels may also be expected impacts as a result of normal wear on the wheels after a certain number of miles that may result in flat areas on the train wheels. Other types of objects or equipment may also result in expected impacts depending on the construction of the train cars, the types of cargo being carried, and the locations where the train is operating.

Output signals from CPU 220 may be communicatively coupled to various control action generators 420, 430, each of which may be configured to issue specific control action signals or commands based on the types or combinations of force components received. A communication interface 440 may also be provided to receive the control action signals or commands from control action generators 420, 430, and convey those control action signals to the proper entity.

Industrial Applicability

The disclosed method and apparatus allow for the detection and characterization of objects that are protruding beneath, hanging below, dragging beneath, or otherwise improperly extending from train 128 in the direction of train rails 122, 124. The disclosed method and apparatus distinguish between different types or instances of dragging equipment or improperly protruding equipment by receiving and processing signals indicative of at least the horizontal and vertical force components generated by the impact of dragging equipment 129 against stationary impact elements 102, 104, 106, 108.

Figure 5:
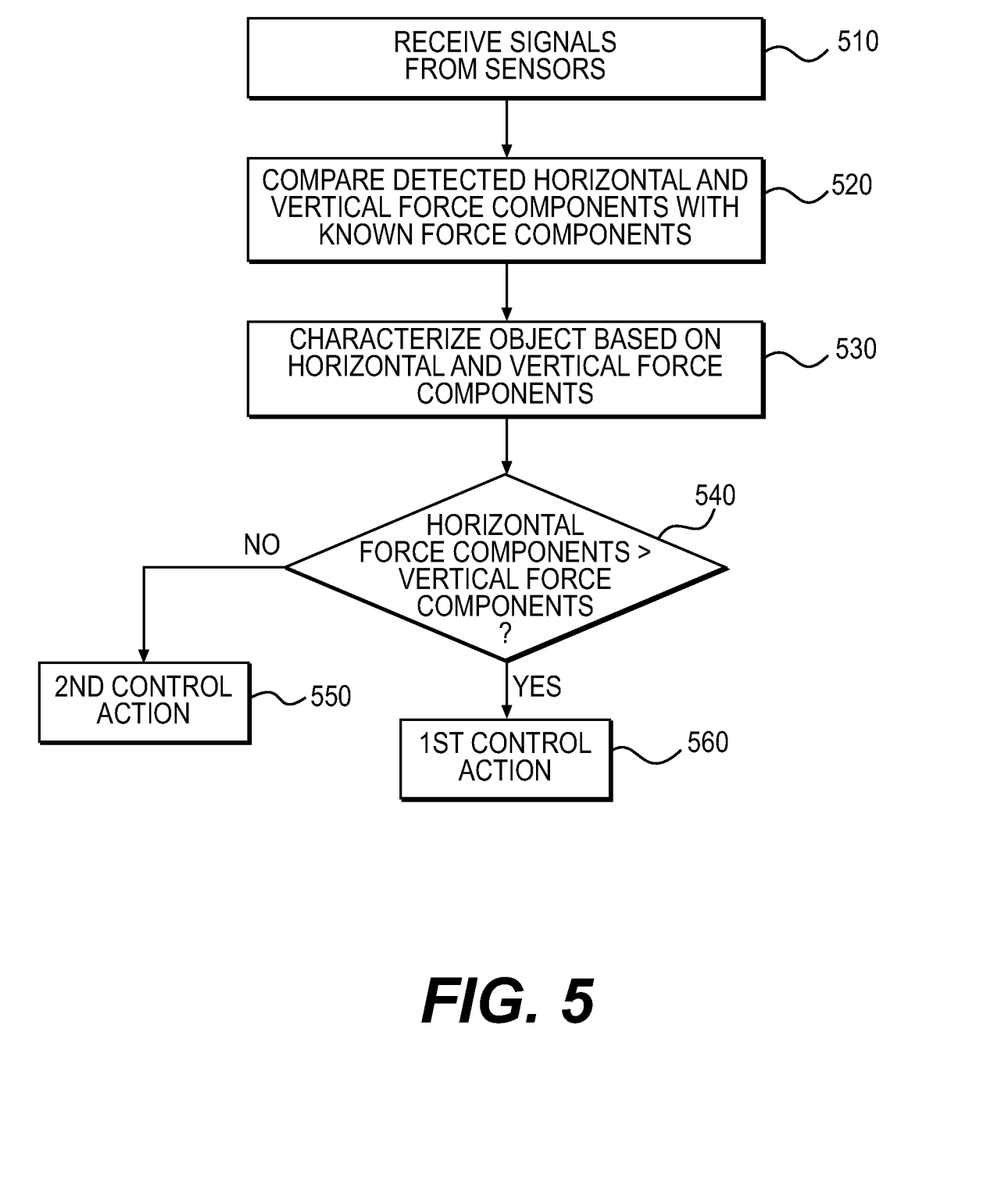
FIG. 5 is a flowchart depicting an exemplary disclosed method of characterizing the type of equipment that is dragging using the exemplary system of FIGS. 1, 2, and 3.

FIG. 5 shows at step 510 that CPU 220 may be configured to receive signals from sensors 142, 144, 146, 148 mounted on inclined angle impact surfaces 103 of stationary impact elements 102, 104, 106, 108. The signals received by CPU 220 may be indicative of the horizontal and vertical force components generated by impact of dragging equipment or object 129 with one of stationary impact elements 102, 104, 106, 108. In various implementations, CPU 220 may be configured to filter out irrelevant data, such as signals that indicate an impact too small to be relevant to an identification of dragging equipment. CPU 220 may also be configured to record the vertical and horizontal force components applied to impact elements 102, 104, 106, 108 as a result of dragging equipment or other improperly protruding objects 129 that may strike one or more of impact elements 102, 104, 106, 108 as train 128 travels along rails 122, 124 and passes over impact elements 102, 104, 106, 108. CPU 220 may also be configured to record the amplitude, frequency, duration, or other parameters of each of the horizontal and vertical force components.

At step 520 CPU 220 may be configured to compare the force components to preset ranges, magnitudes, durations, or directions for force components known to result from expected types of impacts, as described above. CPU 220 may also be configured to compare the force components to a look-up table 410 of force components experienced by expected impacts from certain types of dragging equipment, improperly protruding equipment, or other situations. Information that CPU 220 determines using the signals received from sensors 142, 144, 146, 148 may allow CPU 220 to distinguish certain types of impacts, such as those caused by a dragging air hose, or brake line, from other types of impacts, such as those caused by a door hanging down from a hopper car after unloading at a terminal. In addition, CPU 220 may be configured to distinguish forces that may have larger magnitude and shorter duration vertical force components, and small or non-existent horizontal components, such as may be caused by a flat wheel, or wheel with worn tread, from other impact forces that include different ratios of vertical and horizontal force components, or different magnitudes and durations of the force components.

At step 530 CPU 220 may be configured to characterize specific forces as having been caused by specific types of dragging equipment, improperly protruding equipment, flat wheels, or other conditions. For example, CPU 220 may be configured to characterize an impact force having a large vertical component, small or non-existent horizontal component, and short duration, as being an impact force caused by a flat wheel. The flat wheel may result in a portion of the train wheel or other component striking nearly vertically down on an impact element 102, 104, 106, or 108 as train 128 passes over the impact element. Alternatively, CPU 220 may characterize another impact force having both vertical and horizontal components of relatively small magnitude, and a longer duration, as being an impact force caused by a dragging air hose or brake line.

At step 540, in one exemplary implementation CPU 220 may be configured to evaluate whether the detected horizontal force components are greater than the detected vertical force components. Based on an evaluation of the signals received from sensors 142, 144, 146, 148, CPU 220 may be configured to implement different types of control actions based on the impact force components detected. At step 550 CPU 220 may be configured to implement a second control action if the detected horizontal force components are not greater than the detected vertical force components. At step 560 CPU may be configured to implement a first control action if the horizontal force components are greater than the vertical force components.

In one exemplary implementation, CPU 220 may be configured to characterize an impact having specific parameters, such as primarily vertical components of a certain magnitude, as having been caused by a flat wheel. In this exemplary implementation, CPU 220 may be configured to implement a first control action or set of control actions, including scheduling maintenance specific to that type of impact, and may also store data that associates the detected impact with a specific location on the train, such as identifying the impact as having been caused by a specific wheel on a particular train car. In another exemplary implementation, CPU 220 may be configured to characterize an impact having specific parameters, such as horizontal force components greater than vertical force components, as having been caused by a dragging air line or brake line. In various exemplary implementations, CPU 220 may compare the direction, magnitude, frequency, and other parameters of the detected force components to force components known to result from impacts with dragging equipment or objects that have been assessed as potentially dangerous situations. CPU 220 may be configured to implement control actions in these types of situations that may include immediately initiating emergency braking, sending an urgent message to a central control location, or communicating the situation directly to train crew.

CPU 220 may also be configured to evaluate input parameters received from other sensors (not shown) including train car identification, UPS location information, location relative to stationary position sensors, or location relative to wayside stations, and record this information to provide an accurate identification of where a sensed impact took place, and where on the train the dragging or protruding equipment was located. Under other circumstances, CPU 220 may be configured to receive signals from sensors 142, 144, 146, 148 indicative of a different combination of vertical and horizontal force components of different magnitude, duration, or amplitude, and initiate a different control action or set of control actions, such as autonomously stopping the train, or sending a signal to a train operator. CPU 220 may also be configured to store data characteristic of different impacts on impact elements 102, 104, 106, 108, including the frequency of certain types of impacts, and any relationship between other train operating parameters, such as speed, acceleration, frequency of stops and starts, procedures followed during switching of trains in train yards, procedures followed during loading and unloading of train cars, and the frequency or type of impacts.

Various implementations of the disclosed method and apparatus for characterizing objects protruding beneath a train traveling along rails, as discussed above, may enable determination of the types of dragging equipment that are present, the relative risks associated with the dragging equipment, and the types of control actions that should be implemented in each situation. The data gathered may also allow for reduction in false alarms or unnecessary stopping of the train for low risk situations. Additionally, the various implementations may provide information useful to establishing procedures and best practices to reduce the number of occurrences of dragging equipment or objects otherwise protruding beneath a train traveling along rails, improving efficiency and cost savings, and reducing risk to people and property.

One of ordinary skill in the art will recognize that although CPU 220 is illustrated as a single unit, the functionality provided by processor could be provided instead by one or more processors. The one or more processors may be part of a server, client, network infrastructure, mobile computing platform, or a stationary computing platform, one or more of which may be contained at a dispatch office, in a single wayside housing, multiple wayside housings, or at remote locations communicatively coupled over wired or wireless networks through communication interface 440.

It will be apparent to those skilled in the art that various modifications and variations can be made to the disclosed method and apparatus for characterizing an object protruding beneath a train without departing from the scope of the disclosure. Other embodiments of the characterizing method and apparatus will be apparent to those skilled in the art from consideration of the specification and practice of the method and apparatus disclosed herein. It is intended that the specification and examples be considered as exemplary only, with a true scope of the disclosure being indicated by the following claims and their equivalents.

What is claimed is:

1. A method of characterizing dragging equipment protruding beneath a train traveling along a rail, the method comprising:
   receiving one or more signals indicative of a detected horizontal force component and a detected vertical force component generated by impact of the dragging equipment with a stationary impact element of a sensor;
   determining, using a processor, a type of the dragging equipment based on the detected horizontal and vertical force components, and implementing a control action based on the determined type of the dragging equipment.

2. The method of claim 1, wherein characterizing the dragging equipment includes making a comparison of the detected horizontal and vertical force components with known force components of types of the dragging equipment expected to impact the stationary impact element.

3. The method of claim 2, further including implementing a control action based on the comparison.

4. The method of claim 3, wherein implementing a control action based on the comparison includes taking a first control action when the detected horizontal and vertical force components are approximately the same as known force components of impacts by types of the dragging equipment expected to be hanging down underneath the train.

5. The method of claim 3, wherein implementing a control action based on the comparison includes taking a second control action when the detected horizontal and vertical force components are approximately the same as known force components of impacts caused by a flat wheel.

6. The method of claim 1, wherein receiving one or more signals indicative of a detected horizontal force component and a detected vertical force component includes receiving acceleration signals for accelerations in two different orthogonal directions.

7. The method of claim 1, wherein characterizing the dragging equipment includes referencing a look-up table of impact forces characteristically generated by the types of the dragging equipment expected to impact the stationary impact element.

8. The method of claim 1, wherein receiving one or more signals includes generating a charge using the piezoelectric effect of materials in the sensors, with the charge proportional to acceleration of the sensors resulting from an impact on the stationary impact element.

9. The method of claim 1, further including:
   determining magnitudes and durations of the detected horizontal and vertical force components; and
   characterizing the dragging equipment based on magnitudes and durations of the detected horizontal and vertical force components.

10. The method of claim 1, wherein characterizing the dragging equipment includes comparing magnitudes of the detected horizontal and vertical force components with known magnitudes of force components generated by objects expected to impact the stationary impact element.

11. The method of claim 1, wherein characterizing the dragging equipment includes comparing durations of the detected horizontal and vertical force components with known durations of force components generated by objects expected to impact the stationary impact element.

12. The method of claim 1, wherein characterizing the dragging equipment includes:
   comparing the detected horizontal force component with a first range of values; and
   comparing the detected vertical force component with a second range of values to determine the type of the dragging equipment.

13. The method of claim 1, wherein the type of the dragging equipment includes one of:
   a first type including a door hanging down from a hopper; and
   a second type including a dragging air hose or a brake line.

14. An apparatus for characterizing dragging equipment protruding beneath a train moving along rails, the apparatus comprising:
   a stationary impact element positioned to extend in a direction approximately orthogonal to a travel direction of the train and extending across the rails, wherein an impact surface of the stationary impact element is oriented at an angle inclined to the travel direction;
   one or more sensors mounted on the stationary impact element in one or more directions that allow each of the one or more sensors to detect horizontal and vertical force components on the stationary impact element when the dragging equipment impacts the stationary impact element; and
   a processor configured to determine a type of the dragging equipment based on the horizontal and vertical force components.

15. The apparatus of claim 14, wherein the processor is further configured to characterize the dragging equipment by comparing the detected horizontal and vertical force components with directional force components of known types of the dragging equipment expected to impact the stationary impact element.

16. The apparatus of claim 15, wherein the processor is further configured to implement a control action based on the comparison.

17. The apparatus of claim 16, wherein the processor is further configured to implement a first control action when the horizontal force components are larger than the vertical force components, and implement a second control action when the vertical force components are larger than the horizontal force components, the first and second control actions being different.

18. The apparatus of claim 15, wherein the processor is further configured to reference a look-up table of impact forces characteristically generated by the known types of the dragging equipment.

19. The apparatus of claim 14, wherein:
the stationary impact element is a first stationary impact element; and
the apparatus further includes a plurality of stationary impact elements spaced at intervals extending in the direction approximately orthogonal to the travel direction of the train and extending across the rails, with at least one of the plurality of stationary impact elements positioned between the rails and at least another one of the plurality of stationary impact elements positioned adjacent the outside of at least one of the rails.

20. The apparatus of claim 14, wherein the one or more sensors comprise at least one sensor mounted on the stationary impact element and adapted to sense acceleration in two or more orthogonal directions.

21. The apparatus of claim 14, wherein the one or more sensors are each mounted on the stationary impact element at approximately a 45 degree angle to a horizontal direction extending across the rails.

22. The apparatus of claim 14, wherein the one or more sensors comprise an accelerometer mounted on the stationary impact element on a side of the stationary impact element opposite from a side on which the dragging equipment impacts the stationary impact element.

23. The apparatus of claim 14, wherein the one or more sensors comprise transducers that use the piezoelectric effect to generate charges proportional to acceleration.

24. The apparatus of claim 14, wherein the one or more sensors are embedded in a layer of material adhered to the stationary impact element.

25. The apparatus of claim 14, wherein the type of the dragging equipment includes one of:
a first type including a door hanging down from a hopper; and
a second type including a dragging air hose or a brake line.

26. A method of characterizing dragging equipment protruding under a train traveling along a rail, the method comprising:
receiving one or more signals indicative of a detected horizontal force component and a detected vertical force component generated by impact of the dragging equipment with a stationary impact element of a sensor;
receiving from a look-up table known directional force components of the types of the dragging equipment expected to impact the stationary impact element;
making a comparison, using a processor, of the detected horizontal and vertical force components with the known directional force components;
determining, using the processor, a type of the dragging equipment based on the comparison; and
implementing a control action based on the comparison.

* * * * *